United States Patent
Lin et al.

(10) Patent No.: US 9,334,441 B2
(45) Date of Patent: May 10, 2016

(54) WAVELENGTH-SHIFT COMPOSITE LIGHT-STORING POWDER AND METHOD OF MANUFACTURING AND APPLYING THE SAME

(71) Applicant: TAIWAN TEXTILE RESEARCH INSTITUTE, New Taipei (TW)

(72) Inventors: Sheng-Jen Lin, New Taipei (TW); Ying-Hsiu Hsiao, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 175 days.

(21) Appl. No.: 13/946,139

(22) Filed: Jul. 19, 2013

(65) Prior Publication Data

US 2014/0319422 A1      Oct. 30, 2014

(30) Foreign Application Priority Data

Apr. 26, 2013    (TW) .............................. 102115123 A

(51) Int. Cl.
   *C09K 11/77*  (2006.01)
   *C09K 11/02*  (2006.01)
   *D01F 1/10*  (2006.01)
   (Continued)

(52) U.S. Cl.
   CPC ............... *C09K 11/025* (2013.01); *C09K 11/77* (2013.01); *C09K 11/7792* (2013.01); *D01F 1/10* (2013.01); *D01F 6/60* (2013.01); *D01F 6/62* (2013.01)

(58) Field of Classification Search
   CPC ...................................................... C09K 11/77
   USPC ...................................................... 252/301.36
   See application file for complete search history.

(56) References Cited

U.S. PATENT DOCUMENTS

| | | |
|---|---|---|
| 7,074,345 B2 | 7/2006 | Saito et al. |
| 2009/0173915 A1 | 7/2009 | Naum et al. |
| 2011/0024686 A1 | 2/2011 | Chang et al. |

FOREIGN PATENT DOCUMENTS

| | | |
|---|---|---|
| JP | 2005298529 A | 10/2005 |
| JP | 200927883 | 7/2009 |

(Continued)

OTHER PUBLICATIONS

Li, Huihui et al. "Photocatalysis enhancement of CaAl2O4:Eu2+, Nd3+ @ TiO2 composite powders". Res Chem Intermed (2010) 36:51-59.*

(Continued)

*Primary Examiner* — Alexander Weddle
(74) *Attorney, Agent, or Firm* — McClure, Qualey & Rodack, LLP

(57) ABSTRACT

A wavelength-shift composite light-storing powder and method of manufacturing and applying the same. Wherein, inorganic metal oxide and light-storing material containing rare earth elements are made to collide at high speed in an environment of extremely low temperature. The collision process makes said inorganic metal oxide to produce fusion reaction on surface of said light-storing material, that causes changes of lattice structure, to generate photon shift phenomenon and produce said wavelength-shift composite light-storing powder. Said composite light-storing powder is apt to engage cross-linked structure of thermoplastic polymer in a high temperature blending process, to achieve even distribution. Finally, through a filament process to produce successfully light-storing fibers capable of emitting lights of various wavelengths, to raise its heat resistance and wash durability.

6 Claims, 4 Drawing Sheets

(51) Int. Cl.
  *D01F 6/60* (2006.01)
  *D01F 6/62* (2006.01)

(56) References Cited

FOREIGN PATENT DOCUMENTS

| TW | 564268 | 12/2003 |
|---|---|---|
| TW | I351427 B | 11/2011 |
| TW | I372176 | 9/2012 |

OTHER PUBLICATIONS

Potdevin, Audrey et al. "Luminescent Nanocomposites Made of Finely Dispersed $Y_3Ga_5O_{12}$:Tb Powder in a Polymer Matrix: Promising Candidates for Optical Devices". Langmuir (2012), 28:13526-13535.*

* cited by examiner

WAVELENGTH-SHIFT COMPOSITE LIGHT-STORING POWDER AND METHOD OF MANUFACTURING AND APPLYING THE SAME

BACKGROUND OF THE INVENTION

1. Field of the Invention

The present invention relates to a light-storing material, and in particular to a wavelength-shift composite light-storing powder and method of manufacturing and applying the same, that is made through using an inorganic metal oxide.

2. The Prior Arts

Since the discovery of the long afterglow phenomenon in the early 20$^{th}$ century, the development of the light-storing material has progressed rapidly. Various light-storing materials are utilized extensively in the manufacturing of the light-storing objects. The light-storing material is able to emit specific lights after absorbing ultra-violet light or other radiations, and that is referred to as the fluorescence light or afterglow. The light-storing material can be made into light-storing fiber, that is able to absorb sun light, ultraviolet light in daytime, to store it as light energy, and in darkness or at night, it can give out lights of various colors. The costume made of light-storing fiber is colorful and glamorous, without the need to use dye. As such, it can avoid environment pollution, being non-toxic and un-harmful, having no radioactivity, thus fulfilling the requirement of environment protection.

With regard to the related patent case, Taiwan Patent No 564268 discloses "A night time high luminance fiber and method of manufacturing the same". Wherein, it provides a night time high luminance fiber, having the characteristics of long time high luminance multi-color emission, without causing harm to the human body, as such it can be used in embroidery and garments. The fiber is a kind of a shell and core type composite fiber, formed by polyester resin or polyolefin resin of night luminance pigment as its core, and polyester resin not containing the night luminance pigment as its shell. In contrast to the pure fiber, it contains night luminance pigment of 7 to 25% by weight, and one minute after termination of agitation, it can still retain residue luminance of over 500 mcd/m$^2$. For a single fiber, its thickness is below 40 μm.

In addition, Taiwan Patent No. 200927883 discloses a "Wash durability light-storing masterbatch and fiber, and method of manufacturing the same". Wherein, it emphasizes the use of hydrophobic material, to mix it with light-emitting material such as aluminate salts having rare earth elements, to produce light-storing masterbatches. Then, it goes through a melting and spinning process, to form a shell and core type light-storing fiber. The use of hydrophobic material is to devoid the light-storing material in the light-storing fiber from the problem of hydrolysis due to moisture.

However, usually, the conventional light-storing fiber must use high contents of light-storing powder, about 30% by weight, thus it has the drawback of high production cost, monotonous emitted light color, and it can not be mass produced. Also, it has the problem of insufficient heat resistance for the spinning and yarning processes, and the fiber applying process does not have wash durability, and can not withstand filament processing and rectification.

Therefore, there exists a need in the Industries to develop a light storing material that is heat resistant and wash durable, and can be mass produced to emit lights of various colors, so as to achieve ideal light-storing fiber or fabric, to increase its application scope and competitiveness.

SUMMARY OF THE INVENTION

In view of the problem and drawbacks of the prior art, a major objective of the present invention is to provide a wavelength-shift composite light-storing powder and a method of manufacturing and applying the same, that is realized through high speed collisions in an environment of extremely low temperature, so that the metal ions of inorganic metal oxide can be imbedded into the structure defects of the light-storing material, to cause photon jump across energy gap, to produce the composite light-storing powder of cool color series light wavelength. As such, the single wavelength light emission of the light-storing material of the prior art can be upgraded to the multi wavelength light emission of the composite light-storing powder of the present invention, to increase its application scope and competitiveness.

Another objective of the present invention is to provide a wavelength-shift composite light-storing powder and method of manufacturing and applying the same, to enable the light-storing master-batch and the light-storing fiber to emit lights of various colors in contrast to the prior art, to raise the heat resistance and wash durability of the light-storing fiber, so as to reduce Denier number and amount utilized.

In order to achieve the objective mentioned above, the present invention provides a wavelength-shift composite light-storing powder, composed of light-storing material containing rare earth elements, and inorganic metal oxide. Wherein, the inorganic metal oxide is fused and formed on the surface of light-storing material containing rare earth elements, in a high speed gas flow, and in an environment of extremely low temperature −100 to −196° C., to cause change of energy and produce wavelength-shift phenomenon. The wavelength-shift composite light-storing powder of the present invention is capable of emitting lights of various colors, to produce lights of different wavelengths at different times.

The present invention also provides a wavelength-shift composite light-storing powder manufacturing method, including the following steps. Firstly, provide a light-storing material containing rare earth elements and inorganic metal oxide. Next, introduce in a high speed gas flow, and in an environment of extremely low temperature −100 to −196° C., to make light-storing material having rare earth elements, and inorganic metal oxide to collide at high speed. Then, utilize the instantaneous high temperature caused by the collision and the extremely low temperature of the environment, to make the metal ions of the inorganic metal oxide to produce fusion reaction, to change the lattice structure of the light-storing powder containing rare earth elements, so as to obtain the wavelength-shift composite light-storing powder.

The present invention also provides a light-storing fiber manufacturing method, including the following steps. Firstly, mix the multi-wavelength composite light-storing powder of 1 to 30% by weight into thermoplastic polymer of 50 to 95 weight %, ring structure test agent having a dipropylene and a tripropylene functional group of 0.05 to 5% by weight, cross linking agent of 0.01 to 5% by weight, and dispersing agent of 0.01 to 5% by weight, to obtain a mixed powder. Subsequently, put the mixed powder in a high temperature to melt and blend, so that the thermoplastic polymer is in a melted condition. Then, cross link the melted thermoplastic polymer, to make the composite light-storing powder to distribute evenly in the cross-linked thermoplastic polymer. Subsequently, bake to dry the cross linked thermoplastic polymer having the composite light-storing powder distributed therein, to obtain the light-storing masterbatches. Afterwards, perform spinning and filament process for the light-storing masterbatches, and to make the filaments curl into light-storing fibers. The production process described above can raise the heat resistance of the light-storing fiber, to produce successfully the light-storing filament fiber. As such, even after it being washed 50 times with water, it can still retain sufficient luminance. The light-storing fiber of the present invention can be used extensively in various Industries, such as the commodity industry, textile industry, indoor decoration products, and safety products.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a wavelength-shift composite light-storing powder, that is upgraded from the original single wavelength light emission to the multi-wavelength light emission. Through the blending and spinning technology of the light-storing masterbatch, the light-storing fiber capable of emitting lights of various wavelengths can be produced. In the following, refer to FIGS. 1 to 3 as to details about how to produce wavelength-shift composite light-storing powder, and then the ways of processing it into light-storing masterbatch and light-storing fiber.

Figure 1:
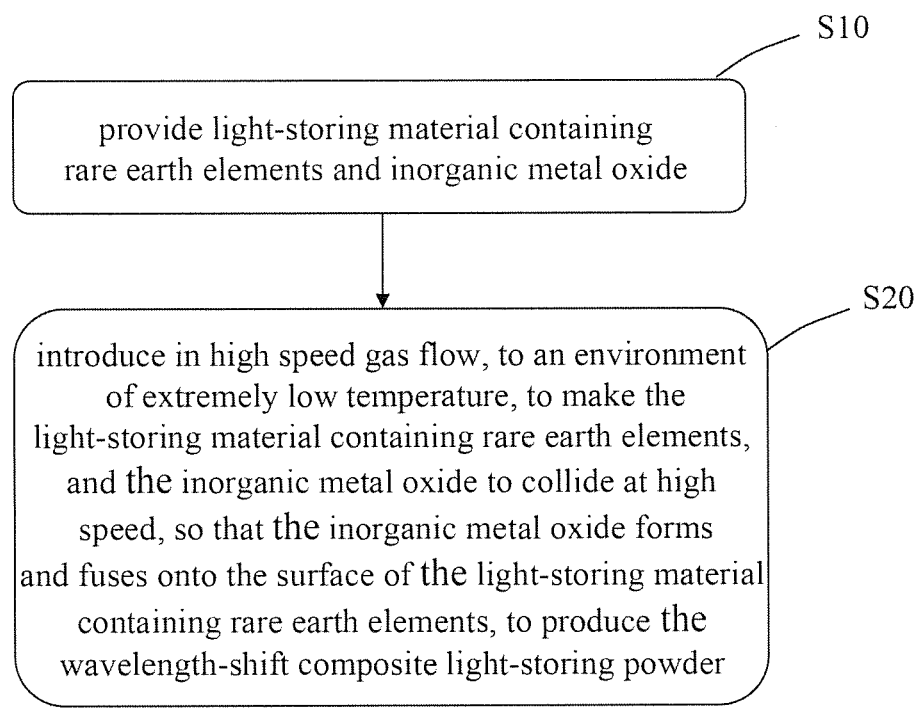
FIG. 1 is a flowchart of the steps of a wavelength-shift composite light-storing powder manufacturing method according to the present invention.

Refer to FIG. 1 for a flowchart of the steps of a wavelength-shift composite light-storing powder manufacturing method according to the present invention, including the following steps.

Firstly, as shown in step S10, provide light-storing material containing rare earth elements of 0.1 to 5 weight %, and inorganic metal oxide of 0.01 to 5 weight %. Wherein, $SrAl_2O_4$:Eu,Td can be chosen to use for the light-storing material containing rare earth elements; while the inorganic metal oxide can be selected from one of a group consisting of: zinc oxide, aluminum oxide, calcium oxide, magnesium oxide, zirconium oxide, strontium oxide.

Next, as shown in step S20, introduce in high speed gas flow, such as 100% nitrogen, to establish an environment of relatively low temperature of −100° C. to −196° C., so that light-storing material containing rare earth elements is made to collide with the inorganic metal oxide at high speed. In this collision process, collision heat of instantaneous high temperature on the surface of the light-storing material, can make the metal ions of the inorganic metal oxide to produce fusion reaction due to high temperature, hereby leading to change of lattice structure of the light-storing material due to its defect being filled, thus the emitted photon will produce the photon shift effect, namely, the photons getting more energy, so that the wavelength is shortened. Moreover, through the instant cooling provided by the environment of extremely low temperature, the fusion reaction only occurs at the surface of the light-storing material, and will not cause the luminance to deteriorate significantly. Due to the jumping of electrons across energy gap and imbedded filling of the structure defect, the photon scattering produced by the light agitated free electrons can be reduced for reduction of defects. Also, that will delay the time for the free electrons jumping back to the ground state, to increase light emitting duration.

In the present invention, the wavelength-shift composite light-storing powder is capable of producing lights of multi-color through variations of lattice structure, so that the main peak wavelength of light emitted from the light-storing material $SrAl_2O_4$:Eu,Td can be shifted from the original 565 nm of green light wavelength to the 505 nm and 485 nm of blue-green series light wavelengths.

Figure 2:
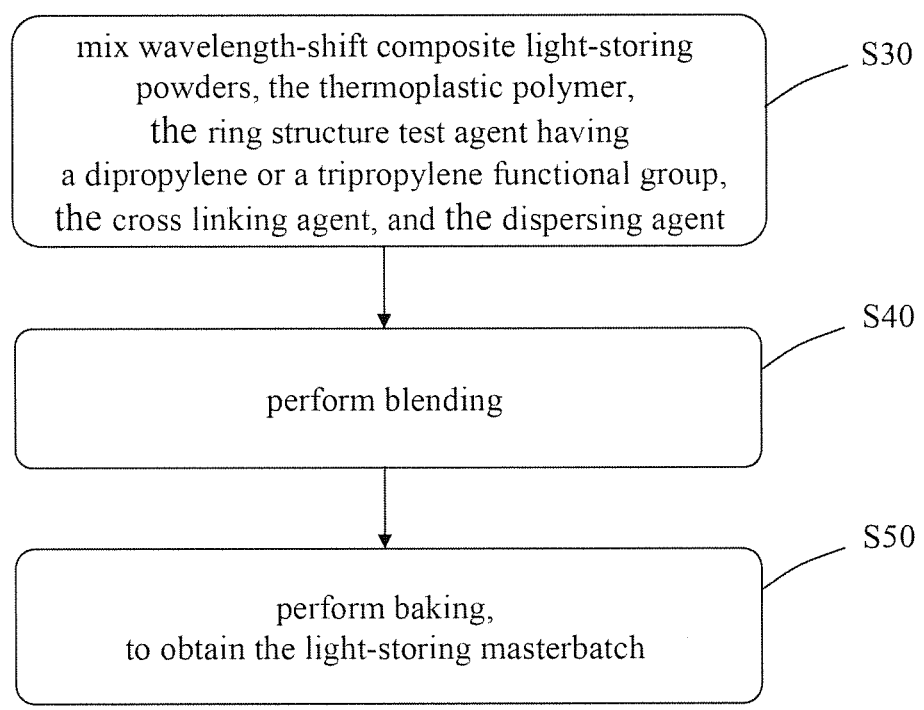
FIG. 2 is a flowchart of the steps of light-storing masterbatches manufacturing method according to the present invention.

Next, refer to FIG. 2 for a flowchart of the steps of light-storing masterbatch manufacturing method according to the present invention. As shown in FIG. 2, the method includes the following steps:

As shown in step S30, mix the wavelength-shift composite light-storing powder of 1 to 30% by weight into the dried thermoplastic polymer. The amount of thermoplastic polymer utilized is 50 to 95% by weight, which can be chosen from polyester powder, nylon powder, polyester particles, or nylon particles. Wherein the Intrinsic Viscosity (IV) of the polyester powder is 0.2 to 2.0; while the relative viscosity (RV) of the nylon powder is 2.0 to 5.0. Then, add in ring structure test agent having a dipropylene and a tripropylene functional group of 0.05 to 5 weight %, cross linkage agent of 0.01 to 5% by weight, and dispersing agent of 0.01 to 5 weight %, to mix them evenly into a mixed powder.

In the descriptions above, the ring structure test agent having dipropylene and tripropylene functional groups can be chosen from one in a group consisting of: diallylphthalate, diallyl succinate,diallyl tartramide,triallyl amine,triallyl trimesate, 2,2-thiobis(p-tert-octylphenolate)nickel,triallyl cyanurate,triallyl isocynaurate, (4-[[4-(aminocarbonyl)phenyl] azo]-N-(2-ethoxyphenyl)-3-hydroxynaphthalene-2-carboxamide) and triacryloylhexahydro-1,3,5-triazine. The dispersing agent can be chosen from the long carbon chain Alkane dispersing agent, that for example can include wax.

Next, as shown in step S40, in a blending temperature of 180° C. to 260° C., melt and blend the mixed powder, to make the thermoplastic polymer in a melted state. Through the cross linking reaction between the cross linking agent and the thermoplastic polymer, to make the composite light-storing powder to distribute evenly in the cross-linked thermoplastic polymer.

Then, as shown in step S50, bake the mixture to dry in a temperature of 85° C., to produce the light-storing masterbatch.

Figure 3:
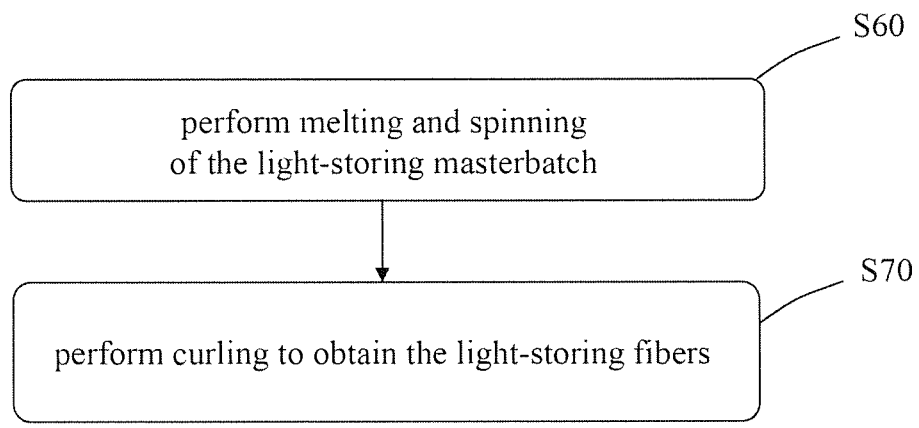
FIG. 3. is a flowchart of the steps of light-storing fiber manufacturing method according to the present invention.

Refer to FIG. 3 for a flowchart of the steps of light-storing fiber manufacturing method according to the present invention, comprising the following step.

Firstly, as shown in step S60, in a spinning temperature of 230 to 290° C., and at a spinning and curling speed of 1000 to 3000 m/min, perform melting and spinning of the light-storing masterbatches into filaments.

Finally, as shown in step S70, perform curling of the filaments into light-storing fibers. The thickness of the light-storing fiber can be 20 to 30 μm, and it can be a single-set fiber, or a double-set fiber of a shell and core structure, such that the composite light-storing powder can be formed into the shell or the core in a double-set fiber of shell and core structure.

In the following, a few embodiments (the first and second embodiment) are described to explain the approaches of manufacturing wavelength-shift composite light-storing powder, and the ways of processing it into a light-storing masterbatch and light-storing fiber. Also, a comparative example is used to explain the objective, principle and effect of the present invention.

(1) Wavelength-shift Composite Light-storing Powder

For the light-storing material powder ($SrAl_2O_4$:Eu,Td) containing rare earth elements and inorganic metal oxide (zinc oxide and aluminum oxide), introduce continuously the liquid nitrogen, and in an extremely low temperature (−100 to −196° C.), and under the introduction of high speed gas flow, to make the two powders to collide, to achieve a production rate of 100-500 kg/h. Due to the extremely low environment temperature, and the instant pulverization produced by the powder collision, the powder diameter will be reduced from 50 microns to below 1 to 5 microns. Also, Due to the instantaneous heat produced by collisions between the two kinds of powders, plus the extremely low temperature of the environment outside, thus causing the light-storing material and the inorganic metal oxide to form temporary or permanent fusion, to produce the wavelength-shift composite light-storing powder. The change of lattice structure of the wavelength-shift composite light-storing powder leads to the change of wavelength of light emitted. In the present invention, the wavelength-shift composite light-storing powder thus produced changes the wavelength of lights emitted from the green light for the original light-storing material of the prior art, to the cool color series wavelength, such as sky blue, ocean blue of the blue-green color series wavelengths.

It has to be specifically mentioned that, the zinc oxide and aluminum oxide themselves do not have light emitting capability. In the case of simple and direct mixing, the emitted photons will be affected by the powder to produce serious scattering to restrict light emitting, thus it will not produce photon shift. In the present invention, for the high speed collision and fusion of the powders, in case fusion does not occur, then it could not produce color change of the emitted light, also the luminance of light will be reduced markedly. Therefore, it is able to determine if fusion is successful directly through the light emitting effect.

(2) Light-storing Masterbatch

Continue the manufacturing process mentioned above, prepare composite light-storing powder of 10 to 25% by weight, together with polyester (PBT) powder, then add ring structure test agent of 0.05 to 5 weight % having dipropylene and tripropylene functional groups, long carbon chain Alkane dispersing agent of 0.5 to 1.5% by weight, to blend them together, then add light sensitive cross linking agent of 0 to 3.0% by weight having 3 functional groups, as shown in Table 1. Subsequently, use a double-axis blending machine to blend it into Light-Storing Masterbatch at a blending temperature of 180 to 260° C. Since light sensitive cross linkage agent having 3 functional groups is added, so that in this environment of high blending temperature, the polyester Masterbatch originally having high crystallinity, will produce free radical cross linking reaction, to form Interpenetrating Network Structure (IPN), to increase the number of the non-fix type area, namely the non-crystalline area. Then, bake the light-storing masterbatch thus obtained, and test luminance of the light-storing masterbatch. Table 2 shows the test results, wherein, due to the increase of the cross linked structure, the number of the non-crystalline areas is increased. For the composite light-storing powder in the polyester structure, since the crystalline area could reduce light scattering, such that the luminance of the light-storing masterbatch will increase due to the increase of the cross linked structure. In addition, the viscosity of the light-storing masterbatch is increased from 0.6 to 0.9, that is beneficial to the subsequent spinning process, since in case the viscosity of the light-storing masterbatch is to low, then filaments can not be formed. The remarkable luminance of the light-storing masterbatch can not only increase the applicability of its product in the future, but it can also reduce the amount of the composite light-storing powder utilized in achieving cost reduction.

TABLE 1

| | inorganic metal oxide (wt %) ZnO | Inorganic metal oxide (wt %) $Al_2O_3$ | ring structure test agent (wt %) 2,2-thiobis(p-tert-octylphenolate)nickel | ring structure test agent (wt %) Triallyamine | thermoplastic polymer (wt %) PBT | light-storing material (wt %) $SrAl_2O_4$: Eu, Td | dispersing agent (wt %) wax | cross linkage agent (wt %) light sensitive cross linkage agent |
|---|---|---|---|---|---|---|---|---|
| comparison example | 0 | 0 | 0.2 | 1.5 | 80.4 | 18 | 0.1 | 0 |
| Embodiment 1 | 1 | 1 | 0.2 | 1.5 | 80.4 | 18 | 0.1 | 1.0 |
| Embodiment 2 | 3 | 0 | 0.2 | 1.5 | 80.4 | 18 | 0.1 | 1.5 |

TABLE 2

| | Intrinsic viscosity (, I.V.) of light-storing masterbatch | luminance after light emitting 2 minutes ($mcd/m^2$) | afterglow duration (min) |
|---|---|---|---|
| composite light-storing powder | — | 1288 | 3509 |
| comparison example | 0.6 | 598 | 1823 |
| Embodiment 1 | 0.82 | 1108 | 3523 |
| Embodiment 2 | 0.89 | 1193 | 3581 |

3. Light-storing Fiber

Continue the manufacturing process mentioned above, a composite spinning and curling machine is used to perform spinning of the light-storing masterbatch, in a spinning temperature of 230 to 290° C. In the present invention, since the light-storing masterbatch is provided with the cross linking structure of Interpenetrating Network Structure (IPN), the viscosity of light-storing masterbatch can reach over 0.8, so that its heat resistance is raised. Therefore, the spinning temperature of the spinning process can be raised, and the higher the temperature the higher its fluidity, to increase the production speed and reduce the cost. Moreover, the filament curling speed can reach 1000 to 3000 m/min due to increase of fluidity of the light-storing masterbatch; while the thickness of the fiber can be reduced from 6DPF to 120D/36F, that is about 3DPF (the thickness of each fiber), as shown in the test results of Table 3. In table 3, it shows that, the present invention indeed can produce wavelength-shift light-storing fiber as required, and after test wash (AATCC135 test method) with water 50 times, luminance of fiber can be maintained at 80 to 120 mcd/m$^2$.

Figure 4:
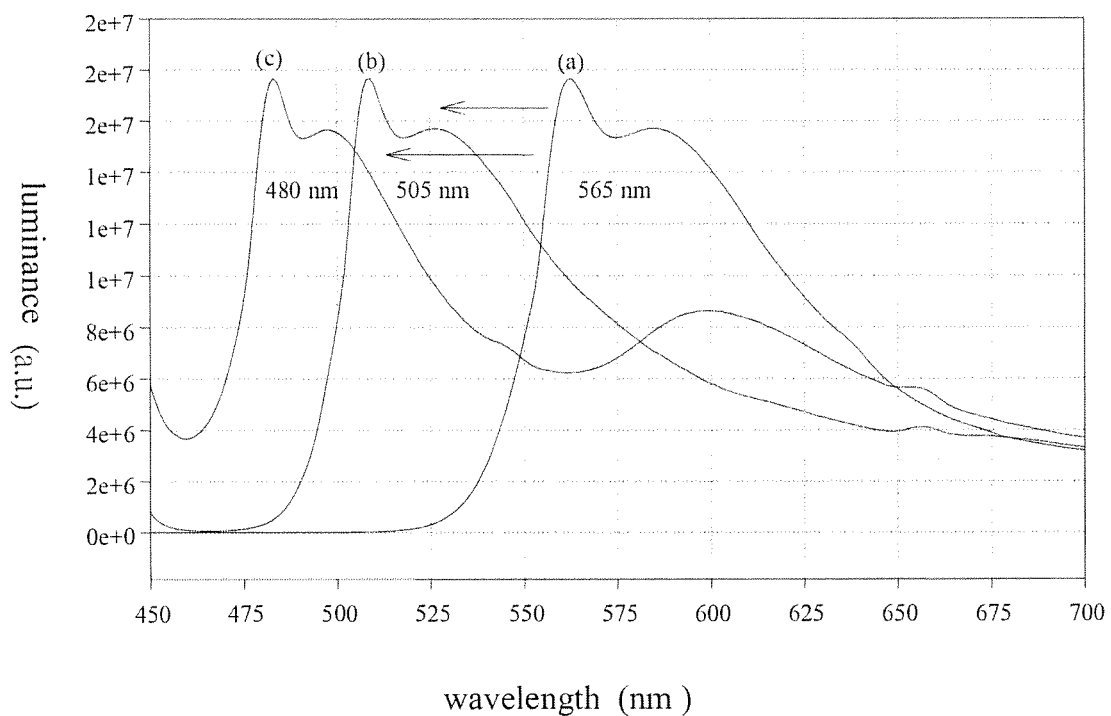
FIG. 4 is a diagram showing light spectrum energy distribution curves for a comparison example and embodiments 1 and 2 according to the present invention.

Furthermore, refer to FIG. 4 for a diagram showing light spectrum energy distribution curves for a comparison example and embodiments 1 to 2 according to the present invention. As shown in FIG. 4, curves (a),(b),(c) represent respectively the spectrum energy distribution curves for the light-storing fiber of a comparison example and embodiments 1 to 2. The result indicates that, in the embodiments of the present invention, the peak of light wavelength emitted by the wavelength-shift light-storing powder is shifted from the green light wavelength 565 nm (curve (a)) for the light-storing material of the prior art, to the ocean blue wavelength 505 nm (curve (b)), and the sky blue wavelength 480 nm (curve (c)).

TABLE 3

| | fiber strength (g/d, %) | luminance before water wash (mcd/m$^2$) | luminance after water wash 50 times (mcd/m$^2$) | light wavelength (nm) |
|---|---|---|---|---|
| comparison example | 1.5 | 120 | 120 | 565 |
| embodiment 1 | 1.6 | 95 | 95 | 505 |
| embodiment 2 | 1.6 | 80 | 80 | 480 |

Summing up the above, the present invention provides a wavelength-shift composite light-storing powder and method of manufacturing and applying the same. Wherein, inorganic metal oxide and light-storing material containing rare earth elements are utilized, in an extremely low temperature and with a high temperature gas flow, to produce fusion of metal ions, to embed into structure defect of light-storing material, so as to change the route of the photons emitted, and the energy of the photons. In this way, the energy levels of the ground state and the excited state for the photons emitted are changed. In this approach, wavelength-shift composite light-storing powder can be made, of which the light-emitting characteristic is changed and is different from the original light-storing material, and that is able to emit light of different wavelengths at different times.

Moreover, for the wavelength-shift composite light-storing powder produced in the present invention, through the free radical cross link reaction, plus 2- or 3-function group chemical reaction test agent, it can produce a quantity of non-fixed areas, to increase the coupling reactions with the thermoplastic polymer, to reduce the cracks of thermoplastic polymer incurred due to heat, so that the composite light-storing powder can be distributed evenly in the thermoplastic polymer. In addition, in the process of producing light-storing masterbatch, the amount of the light-storing material containing rare earth elements is only 8 to 20% by weight, thus reducing the production cost significantly.

For the reasons mentioned above, the light-storing fiber produced from light-storing masterbatch through the filament process is capable of emitting light wavelength of various colors. Also, its heat resistance, fiber strength, and resilience are increased. Since its luminance is raised, the amount of light-storing material utilized can be reduced. In addition, the Denier number and amount utilized for the light-storing fiber can be decreased, to maintain the visibility of 3 mcd/m$^2$ to the naked eyes for more than 3 hours.

Through the application of the present invention, the amount utilized for the light-storing material can be reduced, yet the luminance of the light-storing fiber produced can be raised, to achieve multi-color light emission and long term wash durability. Therefore, it has a promising future, and can be utilized in various Industries, such as the commodity industry, textile industry, electronic industry, indoor decoration products, and safety products.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A wavelength-shift composite light-storing powder manufacturing method, comprising following steps:
   providing a light-storing material containing rare earth elements and an inorganic metal oxide; and
   introducing a high speed gas flow to said light-storing material containing rare earth elements and said inorganic metal oxide under an environment with a temperature of −100 to −196° C. to make said light-storing material containing rare earth elements and said inorganic metal oxide collide at high speed, so that said inorganic metal oxide melts and forms onto a surface of said light-storing material containing rare earth elements to produce said wavelength-shift composite light-storing powder.

2. The wavelength-shift composite light-storing powder manufacturing method, as claimed in claim 1, wherein said high speed gas flow is nitrogen.

3. The wavelength-shift composite light-storing powder manufacturing method as claimed in claim 1, wherein said inorganic metal oxide is present in an amount by weight of 0.3 to 0.8%.

4. The wavelength-shift composite light-storing powder manufacturing method as claimed in claim 1, wherein said light-storing material containing rare earth elements is present in an amount by weight of 0.1 to 5%.

5. The wavelength-shift composite light-storing powder manufacturing method as claimed in claim 1, wherein said light-storing material containing rare earth elements is $SrAl_2O_4$:Eu,Td.

6. The wavelength-shift composite light-storing powder manufacturing method as claimed in claim 1, wherein said inorganic metal oxide is selected from one of a group consisting of zinc oxide, aluminum oxide, calcium oxide, magnesium oxide, zirconium oxide, and strontium oxide.

* * * * *